United States Patent
Hsu et al.

(10) Patent No.: US 6,700,260 B2
(45) Date of Patent: Mar. 2, 2004

(54) ROTOR STRUCTURE OF MOTOR

(75) Inventors: Kuotung Hsu, Taoyuan Hsien (TW); Chih-Chang Chen, Taoyuan Hsien (TW); Chi-Ming Yu, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 108 days.

(21) Appl. No.: 09/741,313

(22) Filed: Dec. 19, 2000

(65) Prior Publication Data

US 2002/0008433 A1 Jan. 24, 2002

(30) Foreign Application Priority Data

Jul. 20, 2000 (TW) .................................. 89212566 U

(51) Int. Cl.⁷ .................. H02K 5/00; H02K 7/06; H02K 7/10; H02K 5/24; H02K 1/22

(52) U.S. Cl. .................. 310/91; 310/81; 310/51; 310/261

(58) Field of Search .............. 310/90, 91, 67 R, 310/81, 51, 191, 209, 261, 156.08, 156.26

(56) References Cited

U.S. PATENT DOCUMENTS

| | | | | |
|---|---|---|---|---|
| 2,913,701 A | * | 11/1959 | Wachholz .................. 340/17 |
| 4,669,009 A | * | 5/1987 | Naoi et al. ................ 360/99 |
| 5,128,574 A | * | 7/1992 | Koizumi et al. ........... 310/90 |
| 5,160,866 A | * | 11/1992 | Hishida et al. ............ 310/90 |
| 5,663,604 A | * | 9/1997 | Takahashi ................ 310/91 |
| 5,821,654 A | * | 10/1998 | Woo ....................... 310/90 |
| RE36,086 E | * | 2/1999 | Hishida et al. ............ 310/90 |
| 6,005,311 A | * | 12/1999 | Matsushima .............. 310/51 |
| 6,137,197 A | * | 10/2000 | Taniguchi et al. ....... 310/67 R |
| 6,208,046 B1 | * | 3/2001 | Lee ...................... 310/49 R |
| 6,208,047 B1 | * | 3/2001 | Agematsu et al. ......... 310/254 |
| 6,239,517 B1 | * | 5/2001 | Nakamura et al. ....... 101/93.04 |
| 6,242,826 B1 | * | 6/2001 | Saito et al. ............... 310/51 |
| 6,252,319 B1 | * | 6/2001 | Sudo et al. ............... 310/51 |
| 6,417,591 B1 | * | 7/2002 | Saito et al. .............. 310/104 |
| 2001/0010435 A1 | * | 8/2001 | Kikuchi et al. ......... 310/67 R |

* cited by examiner

*Primary Examiner*—Burton S. Mullins
*Assistant Examiner*—Julio C. Gonzalez
(74) *Attorney, Agent, or Firm*—MacPherson Kwok Chen & Held LLP

(57) ABSTRACT

A rotor structure of a motor is provided. The rotor structure includes a magnet having a first annular wall, a magnet holder having a base and a second annular wall connected with the first annular wall of the magnet for fixing the magnet, a shaft having one end mounted through the base of the magnet holder, and a stopper mounted in the other end of the shaft.

13 Claims, 4 Drawing Sheets

ROTOR STRUCTURE OF MOTOR

FIELD OF THE INVENTION

The present invention relates to a rotor structure, and more particularly to a rotor structure of a stepping motor having a low rotational inertia.

BACKGROUND OF THE INVENTION

Stepping motors are customarily used direct current (DC) motors for positioning applications requiring rapid acceleration and high speed with low loads. The stepping motor is used as a driving source for rotating an apparatus such as a disk recording medium, a printer and a manipulating arm.

FIG. 1 is a sectional diagram showing a conventional structure of a stepping motor. The stepping motor essentially comprises two major components: a rotor and a stator, wherein the stator is disposed circumferentially by the rotor. The stator structure includes a plurality of bobbins 1 wound by winding coils 2 and outside yokes 3. The rotor structure includes a shaft 4 coupled to a mechanical load (not shown) which it drives, a magnet 5 which is a magnetic ring and a magnet holder 6 used for fixing and supporting the magnet 5 and the shaft 4. The rotor structure is connected to the stator structure via an upper washer 7, a lower washer 8, an upper sleeve bearing 9, a lower sleeve bearing 10, an upper flange 17, a base plate 18 and a spring washer 11.

Referring to FIG. 1, the magnet holder 6 is formed in a full solid so that the weight thereof is very heavy and the rotational inertia of the rotor is greatly increased. Such rotor structure has disadvantages of high cost and heavy weight, which is unfavorable for the acceleration capability, and torque of the motor at high speed. Furthermore, the magnet holder 6 needs to be replaced by a new one if the rotor structure is applied to different sizes of magnets 5 according to different types of stepping motors, which also raises the cost of motor.

A rotor structure of the stepping motor has been developed for overcoming the above drawbacks. Please refer to FIG. 2A, the rotor structure of the stepping motor includes a shaft 4, a magnet 5, a magnet holder 13 and a supporting cylinder 12. The rotor structure of the magnet holder 13 is in a hollow construction having excessive material removed from the rotor. Removal of this excess material improves the motor acceleration capability by reducing rotor inertia and reduces the manufacturing cost of the rotor. Referring to FIG. 2B, when the length H of the magnet 5 shown in FIG. 2A is increased, the magnet holder 13 can continue to be used but the length of the supporting cylinder 12 needs to be increased.

Although the rotor structure shown in FIG. 2A facilitates reducing the rotational inertia thereof, using too long of a supporting cylinder 12 will increase the inertia of the rotor.

It is therefore tried by the applicant to deal with the above situation encountered by the prior art.

SUMMARY OF THE INVENTION

It is therefore an object of the present invention to provide a rotor structure of a motor for decreasing the rotational inertia thereof.

It is another object of the present invention to provide a rotor structure of a motor used in different type motors by adjusting the position of a stopper.

It is another object of the present invention to provide a motor structure for reducing the consumption of the rotor materials to diminish the manufacturing cost.

It is another object of the present invention to provide a rotor-stator assembly having a considerably low rotational inertia.

According to an aspect of the present invention, the rotor structure of the motor includes a magnet having a first annular wall, a magnet holder having a base and a second annular wall connected with the first annular wall of the magnet for fixing the magnet, a shaft having one end mounted through the base of the magnet holder, and a stopper mounted in the other end of the shaft.

Preferably, the magnet is a magnetic ring, the magnet holder is made of a metal material and the magnet holder is made of a metal material. Preferably, the second annular wall of the magnet holder is adhered to the first annular wall. The motor is preferably a stepping motor. Preferably, the magnet holder is integrally formed by punching, and the base of the magnet holder is connected to the one end of the shaft with a bush. Preferably, the bush is assembled to the shaft by interfering and the magnet holder is connected to the bush by riveting.

According to another aspect of the present invention, the motor structure includes a rotor and a stator having a plurality of coils for causing the rotation of the rotor, wherein the rotor includes a magnet having a first annular wall, a magnet holder having a base and a second annular wall connected with the first annular wall of the magnet for fixing the magnet, a shaft having one end mounted through the base of the magnet holder, and a stopper mounted in the other end of the shaft.

According to another aspect of the present invention, the rotorstator assembly having a low inertia includes a rotor and a stator having a plurality of coils for causing the rotation of the rotor, wherein the rotor includes a magnet having a first annular wall, a magnet holder having a base and a second annular wall connected with the first annular wall of the magnet for fixing the magnet, a shaft having one end mounted through the plate of the magnet holder, and a stopper mounted in the other end of the shaft.

The present invention may best be understood through the following descriptions with reference to the accompanying drawings, in which:

DETAILED DESCRIPTION OF THE PREFERRED EMBODIMENTS

Figure 3:
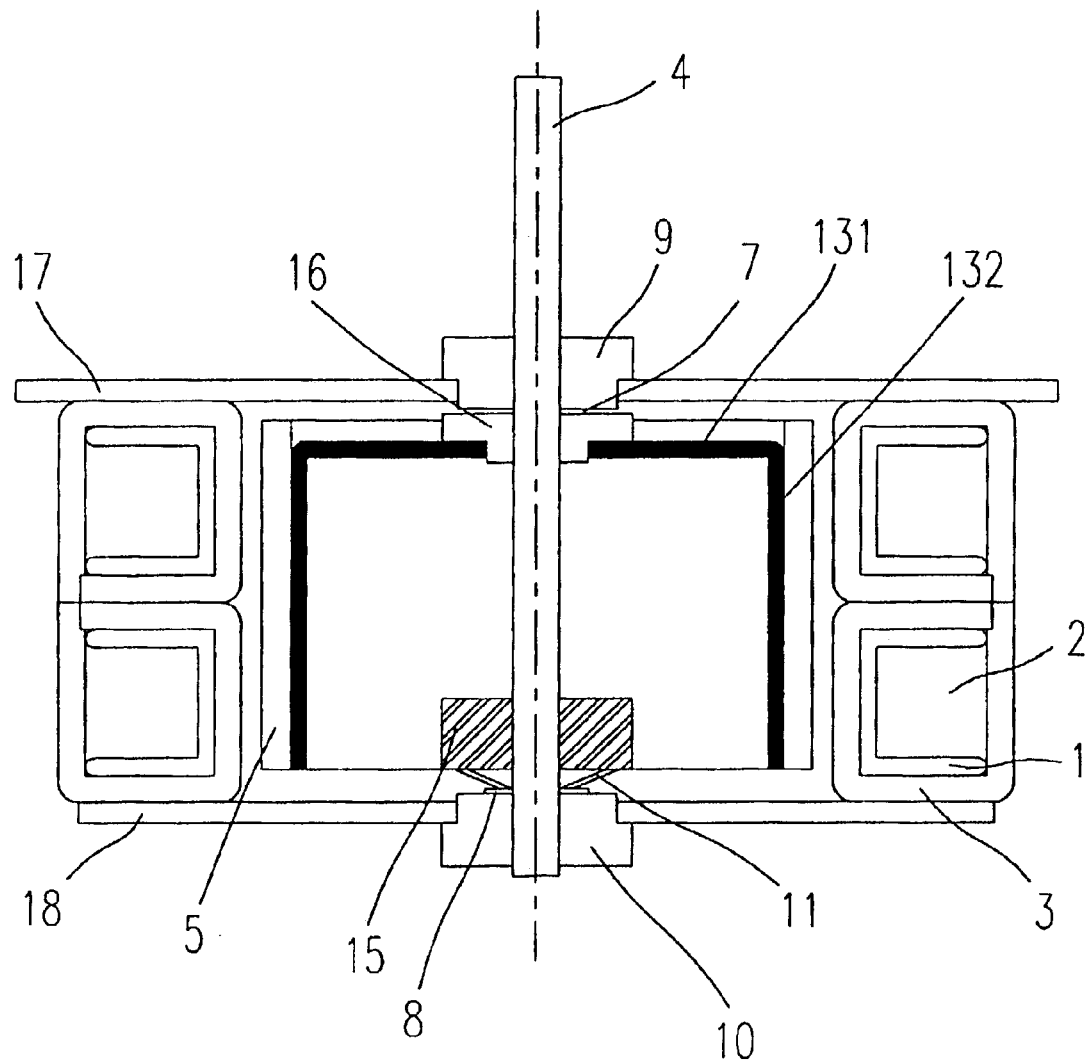
FIG. 3 is a schematic view showing a stepping motor according to a preferred embodiment of the present invention.

FIG. 3 is a cross-sectional view of a stepping motor according to a preferred embodiment of the present invention. The magnet 5 is in a shape of an annular wall. The magnet holder 13 is composed of a base 131 and an annular wall 132, wherein the annular wall 132 of the magnet holder 13 is connected with the annular wall of the magnet 5 for fixing the magnet 5. The magnet 5 is a magnetic ring and the magnet holder 13 is made of a metal material. The annular wall 132 of the magnet holder 13 is adhered to the annular wall of the magnet 5. One end of the shaft 4 is mounted through the base 131 of the magnet holder 13, and a stopper 15 is mounted in the other end of the shaft 4. The base 131 of the magnet holder 13 is connected to the one end of the shaft with a bush 16. The bush 16 is assembled to the shaft 4 by interfering. The magnet holder 13 is connected to the bush 16 by riveting.

Figure 1:
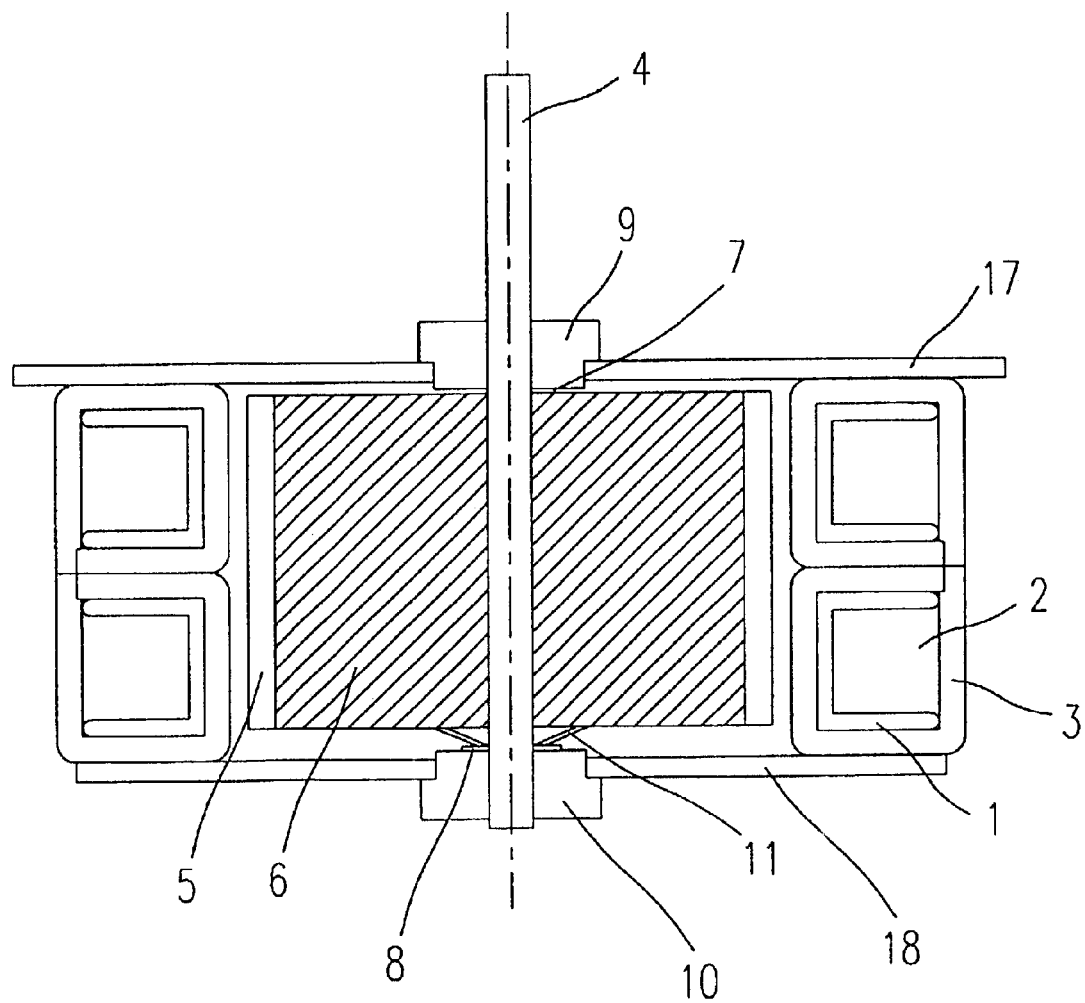
FIG. 1 is a schematic view showing a stepping motor according to the prior art.
Figure 2A:
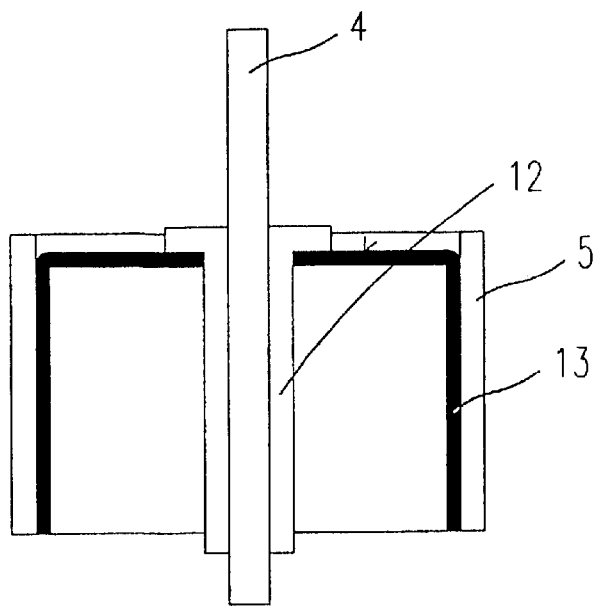
FIGS. 2A and 2B are schematic views showing a rotor structure of another stepping motor according to the prior art.
Figure 2B:
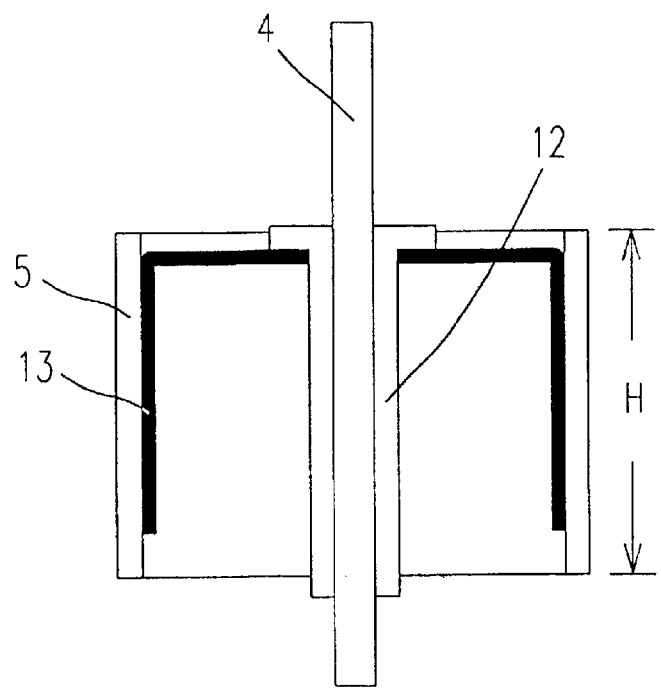

The rotor structure of the stepping motor shown in FIG. 3 according to the present invention is the same as that in FIG. 2A except that a stopper 15 is used to replace the supporting cylinder 12. The stopper 15 is mounted in the shaft 4 for fixing and supporting the shaft 4, and the stopper 15 could be repeatedly utilized without changing the size thereof. Therefore, the manufacturing cost will be largely reduced.

Figure 4A:
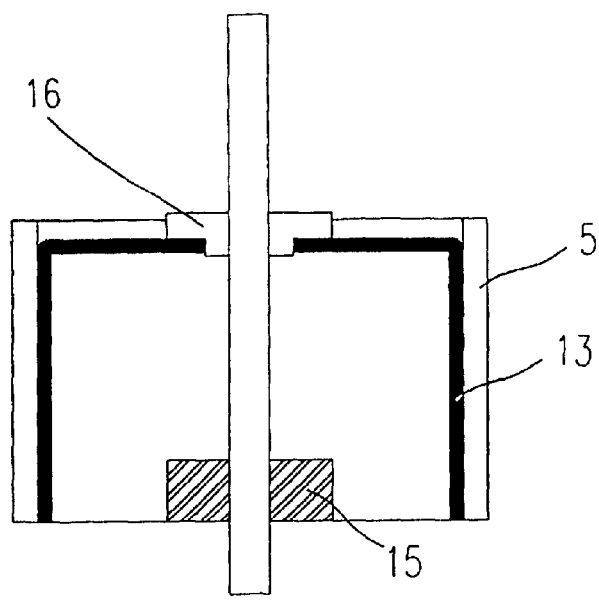
FIGS. 4A and 4B are schematic views showing a rotor structure of a stepping motor according to a preferred embodiment of the present invention.
Figure 4B:
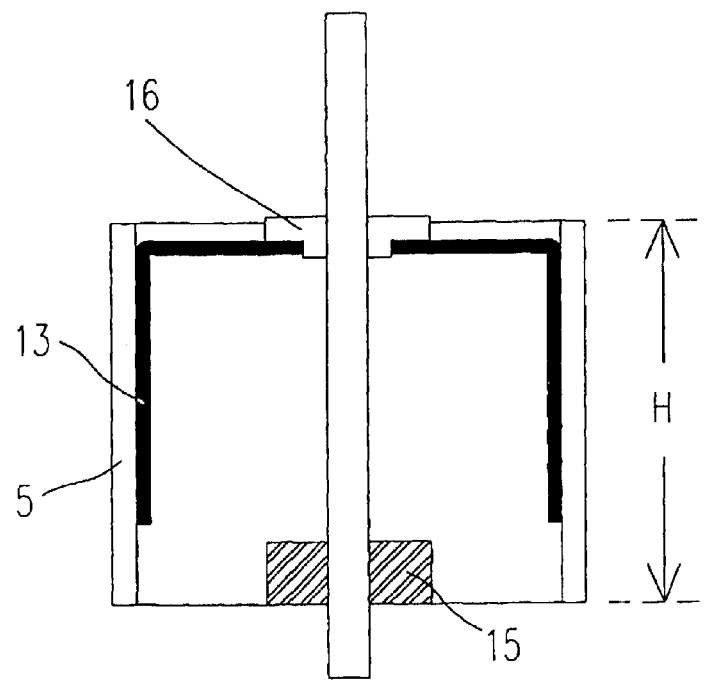

FIGS. 4A and 4B show the positions of the stopper 15 mounted therein when the rotor length is longer and shorter, respectively. Referring to FIG. 4B, when the length H of a the magnet 5 is increased, the magnet holder 13 can continue to be used and the stopper 15 needs to be moved to a proper position corresponding to the increased length of the magnet 5 without increasing the rotational inertia of the rotor.

As will be apparent from the above description, the rotor structure of the stepping motor according to the present invention has a low rotational inertia. Moreover, the components of the rotor structure, except for the magnet and the shaft, can continue to be used in different rotor styles, thereby reducing the manufacturing cost of the rotor and increasing the performance of the stepping motor.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A rotor structure of a motor, comprising:
   a magnet having a first annular wall;
   a magnet holder having a base and a second annular wall connected with said first annular wall of said magnet for fixing said magnet;
   a shaft having one end mounted through said base of said magnet holder; and
   a stopper for supporting and fixing the other end of said shaft;
   wherein said stopper is fixedly positioned along said shaft in one location within a range of possible locations to maintain a relatively low rotational inertia, said one location corresponded to the length of said magnet.

2. The rotor structure according to claim 1, wherein said magnet is ring-shaped.

3. The rotor structure according to claim 1, wherein said magnet holder is made of a metal material.

4. The rotor structure according to claim 1, wherein said second annular wall of said magnet holder is adhered to said first annular wall.

5. The rotor structure according to claim 1, wherein said magnet holder is formed by punching.

6. The rotor structure according to claim 1, wherein said base of said magnet holder is connected to said one end of said shaft with a bush.

7. The rotor structure according to claim 6, wherein said bush is connected to said shaft by using an interference fit.

8. The rotor structure according to claim 6, wherein said magnet holder is connected to said bush by riveting.

9. A stepping motor structure, comprising:
   a rotor; and
   a stator having a plurality of coils for causing the rotation of said rotor, wherein said rotor comprises:
      a magnet having a first annular wall;
      a magnet holder having a base and a second annular wall connected with said first annular wall of said magnet for fixing said magnet;
      a shaft having one end mounted through said base of said magnet holder; and
      a stopper for supporting and fixing the other end of said shaft,
      said stopper positioned in one location within a range of possible locations to maintain a relatively low rotational inertia, said one location corresponded to the length of said magnet.

10. A rotor-stator assembly of a stepping motor having a relatively low inertia, comprising:
    a rotor; and
    a stator having a plurality of coils for causing the rotation of said rotor, wherein said rotor comprises:
       a magnet having a first annular wall;
       a magnet holder having a base and a second annular wall connected with said first annular wall of said magnet for fixing said magnet;
       a shaft having one end mounted through said base of said magnet holder; and
       a stopper for supporting and fixing the other end of said shaft,
       said stopper positionable along said shaft in one location within a range of possible locations to maintain a relatively low rotational inertia, said one location corresponded to the length of said magnet.

11. The rotor structure according to claim 1, wherein said magnet holder has a fixed length.

12. The rotor structure according to claim 9, wherein said magnet holder has a fixed length.

13. The rotor structure according to claim 10, wherein said magnet holder has a fixed length.

* * * * *